May 30, 1950 N. A. CHRISTENSEN 2,509,672
SEALING DEVICE
Filed March 14, 1947

INVENTOR.
NIELS A. CHRISTENSEN
BY
Bates, Peare & McBean
ATTORNEYS

Patented May 30, 1950

2,509,672

UNITED STATES PATENT OFFICE 2,509,672

SEALING DEVICE

Niels A. Christensen, South Euclid, Ohio

Application March 14, 1947, Serial No. 734,671

9 Claims. (Cl. 309—29)

This invention relates to sealing devices and is particularly adapted for use in effecting a seal for pistons which slide over ports for the control of power streams in fluid pressure systems.

It is well known that lapped finishes of pistons and cylinders cannot be made leakproof under fluid pressure, particularly under operating conditions of temperature change. Moreover, specks of dust or grit cause an abrasive action which render the sealing useless as it cannot be repaired in any practical way. The abrasive action is particularly severe where a piston moves past a port in the cylinder wall in the course of its travel, especially where the sealing device constitutes a resilient ring of non-metallic material.

An object of the present invention is to make a sealing construction which utilizes the advantages of a resilient non-metallic ring, and yet which overcomes the difficulty heretofore experienced whenever the sealing device is moved across one or more ports in a cylinder wall.

Figure 1:
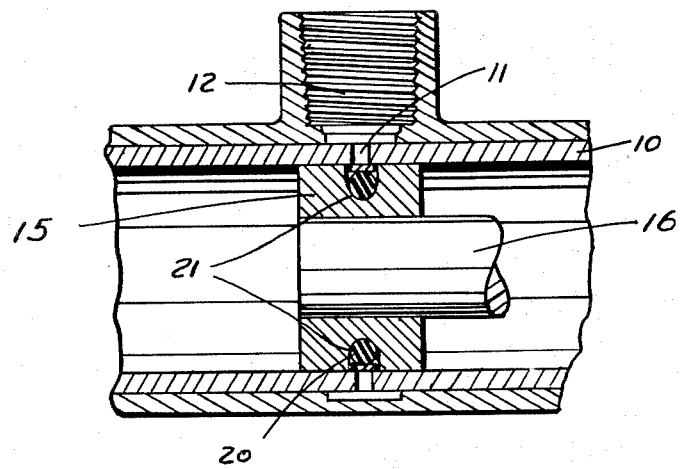
Figure 4:
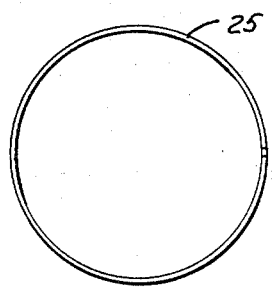
Figure 5:
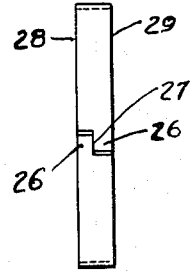
Figure 2:
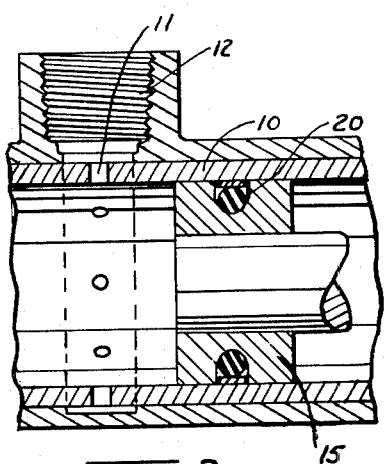
Figure 3:
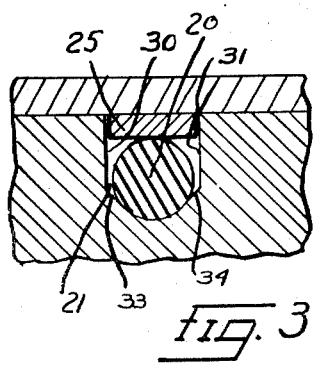

A preferred manner of carrying out the present invention is shown in the drawings, wherein Fig. 1 is a longitudinal section through a part of a cylinder having a piston and a sealing device therein embodying the present invention; Fig. 2 is a sectional view similar to Fig. 1 but showing the piston spaced from the cylinder wall port; Fig. 3 is a sectional view on an enlarged scale illustrating the sealing action of the non-metallic ring; Fig. 4 is a side elevation of the band used for protecting the sealing ring, and Fig. 5 is a side elevation of the band.

The present invention is illustrated in connection with a cylinder 10 which has radially spaced ports 11 therein that are adapted to establish communication between the interior of the cylinder and a conduit 12, by means of which fluid may be conducted either to or from the cylinder. The cylinder is also shown as having a piston 15 therein to which a piston rod 16 is attached for reciprocation of the piston in any suitable manner. In practice, the piston is caused to move past the ports, one position being indicated in Fig. 1 and another position being indicated in Fig. 2.

The sealing device for the piston embodies a resilient ring 20 of non-metallic material having a toroidal shape of normally circular cross-section that is disposed within a groove 21 within the piston. Interposed between the sealing ring 20 and the wall of the cylinder is an expansible band 25, the preferred form of which includes overlapping step-shaped tongues 26 that constitute the movable joint for the ring. The tongues engage laterally along the line 27 so as to allow expansibility and contractibility while maintaining the edges 28 and 29 of the band in co-planar parallel relationship.

The sealing ring 20, when mounted in its operative position within the groove, is under radial compression by the force exerted against it by the band in the final assembled positon of the piston within the cylinder. The normal cross-sectional diameter of the undeformed ring is larger than the radial distance between the bottom of the groove and the contiguous wall of the band, whereby the ring forms a seal in the bottom of its groove and also forms a flat fluid tight seal against the protective band. The band in turn has a small working clearance with the side walls of the groove through which fluid under pressure from either or both sides of the band is free to enter and fill the space on either or both sides of the ring. Thus, as fluid pressure changes or alternates in the normal operation, a differential pressure is set up on the sides of the ring, thereby causing a portion of it to move slightly to one side or the other but at all times maintaining contact against the band so as to effect a fluid pressure seal for the piston. The movement given to the rubber ring by this periodic movement back and forth preserves the life of the ring and maintains its resilient characteristic indefinitely.

The piston groove is preferably of such shape as to hold the ring centrally therein, but to permit a portion of it to shift or roll slightly to the right or left, as aforesaid, consequent upon directional change of fluid pressure within the cylinder. A preferred manner of making the groove to accomplish such purpose is to utilize parallel sides 30 and 31 that extend radially from the open end of the groove, and to use tapering walls 33 and 34 which converge toward the center of the groove, thus providing a saddle in which part of the ring is effectively centered while the remaining portion is free to move axially of the piston and with respect thereto. Thus, the ring and band are concentrically positioned within the groove with the band operating as a housing or armor for the ring. By making the band wider than the port and protecting the ring against engagement with the cylinder wall, the ring is thus guarded against damage due to abrasive contact with the port.

I claim:

1. A sealing device comprising a member having an annular groove in the periphery thereof, a transversely split metallic band occupying the groove and being expansible with reference thereto, and an endless resilient ring occupying the groove and disposed between the ring and the bottom of the groove, the ring having a normally circular cross-sectional shape, the diameter of which is larger than the radial distance between the inner surface of the band and the bottom of the groove, whereby the ring is deformable upon contraction of the band to a predetermined extent and operates to effect a fluid pressure seal for the piston.

2. In combination, a piston having an annular peripheral groove therein, a band and an endless ring seated within the groove, the band comprising a metallic expansible member, and the ring embodying a rubber-like resilient material that is deformable and that operates to urge the band constantly outwardly, whereby it may snugly engage a surrounding cylinder wall, the cross-sectional axial width of the inner ring when deformed being less than the width of the groove, whereby the inner ring partakes of a slight movement axially of the piston consequent upon change in direction of fluid pressure therein.

3. A sealing device for a member having a groove therein, comprising an endless resilient ring and a band concentrically disposed within the groove, the band enclosing the ring and adapted to bear against another member for substantially the full width of the groove, and the ring being maintained under radial compression by the band and operating to hold the band in engagement with the last-mentioned member and also to effect a fluid pressure seal for the first member, said groove having substantially parallel side walls and a bottom converging from said side walls, said ring contacting said bottom while leaving free spaces between the ring and side walls.

4. A sealing device for a piston having a groove therein, a metallic band occupying the groove and disposed adjacent the open end thereof, a resilient ring of rubber-like material disposed behind the band and also positioned within the groove and bearing against the bottom thereof, the ring being maintained under radial compression by the band and the groove having parallel radially extending walls adjacent the outer portion thereof, and having tapered walls adjacent the inner portion thereof, the ring having a snug engagement with the tapered walls and having a loose fit with the radial walls, whereby a part of the ring is free to move upon change of direction of fluid pressure acting upon the piston, said ring operating to effect a fluid pressure seal for the piston.

5. A sealing device for a member having a circular groove comprising a split metallic ring occupying the groove and an endless resilient yielding ring occupying the groove behind the metallic ring and providing a radial pressure against it, the yielding ring being unconfined by the walls of the groove whereby it may move transversely in one direction or the other within the limits of the groove.

6. The combination with a member to be sealed having a circular groove therein of a single split metallic ring occupying the groove and nearly reaching from one wall to the other thereof, and a single yielding resilient ring behind the metallic ring and engaging the bottom of the groove and the inner surface of the split ring but free from one or the other or both walls of the groove so that it may shift on itself and still maintain contact with the split ring.

7. The combination with a cylinder and piston, the piston having a circular groove within its periphery, of a split metallic ring having a cylindrical exterior, said ring occupying the groove and engaging the cylinder wall, and a toroidal rubber ring occupying the groove back of the metallic ring and engaging both the bottom of the groove and the inner surface of the metallic ring, there being spaces within the groove on opposite sides of the rubber ring to enable varying pressure entering one side or the other of the groove past the metallic ring to shift the rubber ring in one direction or the other.

8. In a packing for a piston and cylinder, the combination of a piston having an annular groove, the sides of which are parallel with each other for a distance inwardly from the periphery of the piston and thence connected by an outwardly facing trough-like bottom to the groove, a split ring occupying the groove and having its outer surface engaging the cylinder wall and a toroidal rubber ring resting in the trough-like portion of the groove and having its outermost surface engaging the inner surface of the cylinder-engaging ring while one or the other of the side edges of the toroidal ring are out of contact with the straight parallel sides of the groove.

9. A member to be packed having a groove, and a piston packing in the groove comprising an outer metallic ring transversely split by a slit extending first inwardly from one side of the ring about midway across the ring, then circumferentially for a distance, then outwardly to the other side of the ring, and a toroidal rubber ring on the inner side of the split metallic ring having its outer surface engaging the inner surface of the metallic ring and sealing the circumferential portion of the slit across the metallic ring while allowing fluid under pressure to enter the groove on opposite sides of the toroidal ring through the transverse portions of the split.

NIELS A. CHRISTENSEN.

REFERENCES CITED

The following references are of record in the file of this patent:

UNITED STATES PATENTS

| Number | Name | Date |
|---|---|---|
| 225,488 | Pease | Mar. 16, 1880 |
| 788,769 | Harsen | May 2, 1905 |
| 920,816 | Bott et al. | May 4, 1909 |
| 1,323,192 | Kottusch | Nov. 25, 1919 |
| 1,930,654 | Muchnic | Oct. 17, 1933 |